United States Patent
Wei et al.

(10) Patent No.: US 11,516,159 B2
(45) Date of Patent: *Nov. 29, 2022

(54) SYSTEMS AND METHODS FOR PROVIDING A COMMENT-CENTERED NEWS READER

(71) Applicant: MICROSOFT TECHNOLOGY LICENSING, LLC, Redmond, WA (US)

(72) Inventors: Furu Wei, Beijing (CN); Ming Zhou, Beijing (CN); Yang Liu, Beijing (CN); Ziqiang Cao, Beijing (CN); Shaohan Huang, Beijing (CN); Li Dong, Beijing (CN); Lei Cui, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 253 days.

This patent is subject to a terminal disclaimer.

(21) Appl. No.: 15/578,203

(22) PCT Filed: May 29, 2015

(86) PCT No.: PCT/CN2015/080223
§ 371 (c)(1),
(2) Date: Nov. 29, 2017

(87) PCT Pub. No.: WO2016/191913
PCT Pub. Date: Dec. 8, 2016

(65) Prior Publication Data
US 2018/0159804 A1   Jun. 7, 2018

(51) Int. Cl.
*G06F 15/16* (2006.01)
*H04L 51/04* (2022.01)
(Continued)

(52) U.S. Cl.
CPC ............ *H04L 51/04* (2013.01); *G06F 40/131* (2020.01); *G06F 40/134* (2020.01);
(Continued)

(58) Field of Classification Search
CPC .............................. H04L 51/04; G06F 17/241
See application file for complete search history.

(56) References Cited

U.S. PATENT DOCUMENTS 8,806,320 B1   8/2014   Abdo
8,819,719 B1   8/2014   Chen et al.
(Continued)

FOREIGN PATENT DOCUMENTS

CN   101765840 A   6/2010
CN   103051513 A   4/2013
(Continued)

OTHER PUBLICATIONS

"International Search Report & Written Opinion Issued in PCT Application No. PCT/US2016/058810", dated Dec. 14, 2016, 10 Pages.

(Continued)

*Primary Examiner* — Hua Fan

(57) ABSTRACT

Methods and systems for linking comments to portions of content items. An example computing device receives information associated with a content item produced by a source system, the content item being accessible to other the computing devices via a network and receives a comment associated with the content item, the comment produced by one of the other computing devices. In response to receiving the information and the comment, the computing device predicts a subsection of the content item to link to the received comment based at least on details associated with the content item and the comment, then makes information associated with the predicted subsection of the content item available to other computing devices requesting access to the content item.

20 Claims, 6 Drawing Sheets

(51) Int. Cl.
  *G06F 40/30* (2020.01)
  *G06F 40/131* (2020.01)
  *G06F 40/134* (2020.01)
  *G06F 40/169* (2020.01)
  *G06F 40/284* (2020.01)
  *G06F 40/289* (2020.01)
  *G06F 40/295* (2020.01)
  *G06F 17/18* (2006.01)
  *G06N 5/02* (2006.01)

(52) U.S. Cl.
  CPC .......... *G06F 40/169* (2020.01); *G06F 40/284* (2020.01); *G06F 40/289* (2020.01); *G06F 40/295* (2020.01); *G06F 40/30* (2020.01); *G06F 17/18* (2013.01); *G06N 5/022* (2013.01)

(56) References Cited

U.S. PATENT DOCUMENTS

| | | | |
|---|---|---|---|
| 8,972,413 | B2 | 3/2015 | Lee et al. |
| 9,386,107 | B1 | 7/2016 | Browning et al. |
| 2007/0118794 | A1 | 5/2007 | Hollander et al. |
| 2007/0260564 | A1 | 11/2007 | Peters et al. |
| 2010/0145678 | A1 | 6/2010 | Csomai et al. |
| 2010/0278453 | A1 | 11/2010 | King |
| 2011/0122220 | A1 | 5/2011 | Roberts et al. |
| 2011/0209043 | A1* | 8/2011 | Guo .......... G06F 40/30 715/230 |
| 2012/0047172 | A1 | 2/2012 | Ponte et al. |
| 2012/0226996 | A1 | 9/2012 | Park et al. |
| 2012/0310922 | A1 | 12/2012 | Johnson et al. |
| 2012/0311618 | A1* | 12/2012 | Blaxland .......... H04H 60/45 725/9 |
| 2012/0330968 | A1 | 12/2012 | Lee et al. |
| 2013/0073545 | A1 | 3/2013 | Jain |
| 2013/0091419 | A1 | 4/2013 | Caliman et al. |
| 2013/0332840 | A1 | 12/2013 | Roth et al. |
| 2013/0332856 | A1 | 12/2013 | Sanders et al. |
| 2014/0013206 | A1 | 1/2014 | Jang |
| 2014/0013241 | A1 | 1/2014 | Brown et al. |
| 2014/0033015 | A1 | 1/2014 | Shaver |
| 2014/0052540 | A1 | 2/2014 | Rajaram et al. |
| 2014/0094241 | A1 | 4/2014 | Guinn et al. |
| 2014/0181694 | A1* | 6/2014 | Barman .......... G06Q 50/01 715/753 |
| 2014/0280236 | A1* | 9/2014 | Faller .......... H04L 51/32 707/749 |
| 2014/0298201 | A1 | 10/2014 | Tsui et al. |
| 2014/0344359 | A1 | 11/2014 | Broz et al. |
| 2015/0026192 | A1 | 1/2015 | Kamerman et al. |
| 2015/0106304 | A1 | 4/2015 | Gupta et al. |
| 2015/0120718 | A1 | 4/2015 | Luo et al. |
| 2015/0120840 | A1* | 4/2015 | Rostocil, Jr. .......... H04L 65/4015 709/206 |
| 2015/0127591 | A1 | 5/2015 | Gupta et al. |
| 2015/0149502 | A1 | 5/2015 | Rao et al. |
| 2015/0261853 | A1 | 9/2015 | Shao |
| 2015/0381555 | A1 | 12/2015 | Faller et al. |
| 2016/0171111 | A1 | 6/2016 | Kraft et al. |
| 2016/0246769 | A1 | 8/2016 | Screen et al. |
| 2016/0269345 | A1 | 9/2016 | Weizman |
| 2016/0277328 | A1 | 9/2016 | Ishizuka |
| 2018/0150450 | A1 | 5/2018 | Wei et al. |
| 2018/0159804 | A1 | 6/2018 | Wei |
| 2018/0322188 | A1 | 11/2018 | Zhou et al. |

FOREIGN PATENT DOCUMENTS

| | | |
|---|---|---|
| CN | 103412920 A | 11/2013 |
| CN | 103581280 A | 2/2014 |
| CN | 103853761 A | 6/2014 |
| CN | 104462363 A | 3/2015 |
| CN | 104504131 A | 4/2015 |
| CN | 104571818 A | 4/2015 |
| CN | 104820704 A | 8/2015 |
| CN | 104981792 A | 10/2015 |
| WO | 2008031625 A2 | 3/2008 |
| WO | 2014086224 A1 | 6/2014 |

OTHER PUBLICATIONS

"Final Office Action Issued in U.S. Appl. No. 15/578,195", dated Nov. 2, 2018, 13 Pages.

"Non Final Office Action Issued in U.S. Appl. No. 15/578,195", dated Jul. 10, 2018, 15 pages.

"Search report Issued in European Patent Application No. 15893576.7", dated Dec. 19, 2018, 8 Pages.

Delort, Jean Yves., "Identifying Commented Passages of Documents Using Implicit Hyperlinks", In Proceedings of the Seventeenth Conference on Hypertext and Hypermedia, Aug. 22, 2006, 11 Pages.

Ma, et al., "Opinion target extraction in Chinese News Comments", In Proceedings of the 23rd International Conference on Computational Linguistics: Posters, Aug. 23, 2010, pp. 782-790.

"International Search Report and Written Opinion Issued in PCT Application No. PCT/CN2015/080222", dated Mar. 1, 2016, 11 Pages.

Vo, et al., "FBK-TR: Applying SVM with Multiple Linguistic Features for Cross-Level Semantic Similarity", In Proceedings of the 8th International Workshop on Semantic Evaluation, Aug. 2014, pp. 284-288.

"Non Final Office Action Issued In U.S. Appl. No. 15/578,195", dated Aug. 2, 2019, 15 Pages.

"First Office Action And Search Report Issued In Chinese Pate Application No. 201510728069.0", dated Jul. 24, 2019, 14 Pages.

"First Office Action And Search Report Issued In Chinese Pate Application No. 201580043166.4", dated Jul. 29, 2019, 15 Pages.

"The Research and Implementation of QA Techniques Based on Forum Data", In Chinese Doctor Dissertation and Master Thesis of Information Science And Technology, May 15, 2015, 75 Pages.

"Office Action Issued in European Patent Application No. 15893576.7", dated Apr. 8, 2019, 8 Pages.

International Search Report and Written Opinion for PCT/CN2015/080223, dated Feb. 25, 2016.

"Non Final Office Action Issued in U.S. Appl. No. 15/578,195", dated Mar. 7, 2019, 13 Pages.

"Search Report Issued in European Patent Application No. 15893577.5", dated Jan. 22, 2019, 10 Pages.

"Office Action Issued in European Patent Application No. 15893577.5", dated Jan. 2, 2020, 6 Pages.

"Second Office Action Issued in Chinese Patent Application No. 201510728069.0", dated Feb. 7, 2020, 11 Pages.

"Notice of Allowance Issued In U.S. Appl. No. 15/578,195", dated Feb. 27, 2020, 14 Pages.

"Second Office Action Issued in Chinese Patent Application No. 201580043166.4", dated Mar. 20, 2020, 6 Pages.

"Office Action Issued in Chinese Patent Application No. 201510728069.0", dated Apr. 15, 2020, 6 Pages.

"Non Final Office Action Issued in U.S. Appl. No. 15/772,472", dated Mar. 30, 2020, 11 Pages.

"Notice of Allowance Issued in U.S. Appl. No. 15/772,472", dated Aug. 31, 2020, 10 Pages.

"Third Office Action Issued in Chinese Patent Application No. 201580043166.4", dated Aug. 4, 2020, 7 Pages.

"Office Action Issued in Indian Patent Application No. 201717042388", dated Jan. 28, 2021, 7 Pages.

"First Office Action and Search Report Issued in Chinese Patent Application No. 201580082049.9", dated Jun. 30, 2021, 12 Pages.

"Notice of Allowance and Search Report Issued in Chinese Patent Application No. 201580082049.9", dated Feb. 8, 2022, 8 Pages.

* cited by examiner

SYSTEMS AND METHODS FOR PROVIDING A COMMENT-CENTERED NEWS READER

CROSS-REFERENCE TO RELATED APPLICATION

This application is a U.S. National Stage Application of PCT/CN2015/080223, filed May 29, 2015, which application is hereby incorporated by reference. To the extent appropriate, a claim of priority is made to the above disclosed application.

BACKGROUND

There exist many websites that produce news and opinion articles. In some of the websites, users can publish comments about certain news articles. However, the news content and the corresponding comments are often separated or unlinked. Also, in most scenarios, users must scroll to a different area from the news in order to read others' comments or post their own comments.

Other news websites that allow for commenting require that the users must first manually select a word or phrase from the presented news article before they post their comment(s). This adds a burden to a user, thus diminishing the user's experience.

SUMMARY

Technologies are described herein for providing comment and content linking and presentation techniques.

Configurations disclosed herein allow receiving information associated with a content item produced by a source system, the content item being accessible to other the computing devices via a network and receives a comment associated with the content item, the comment produced by one of the other computing devices. In response to receiving the information and the comment, the computing device predicts a subsection of the content item to link to the received comment based at least on details associated with the content item and the comment, then makes information associated with the predicted subsection of the content item available to other computing devices requesting access to the content item.

Configurations disclosed allows users to more easily view/read other comments during reading a news article and allows users to post comments about certain parts of the article without having to actively designate the certain part of the article. This provides a more intuitive interactive user experience comment and improves the user's efficiency in interacting with a computer. This reduces the burden to a user, thus increasing the user's efficiency and experience.

It should be appreciated that the above-described subject matter may be implemented as a computer-controlled apparatus, a computer process, a computing system or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the leftmost digit(s) of a reference number identifies the figure in which the reference number first appears. The same reference numbers in different figures indicate similar or identical items.

DETAILED DESCRIPTION

Overview

Examples described herein provide constructs of a system having a host server that provides linking of comments to specific locations within network accessible content, such as a news article. The system also has a client-side component for presenting content with linked comments.

Various examples, scenarios, and aspects are described further with reference to FIGS. 1-5.

Illustrative Environment

Figure 1:
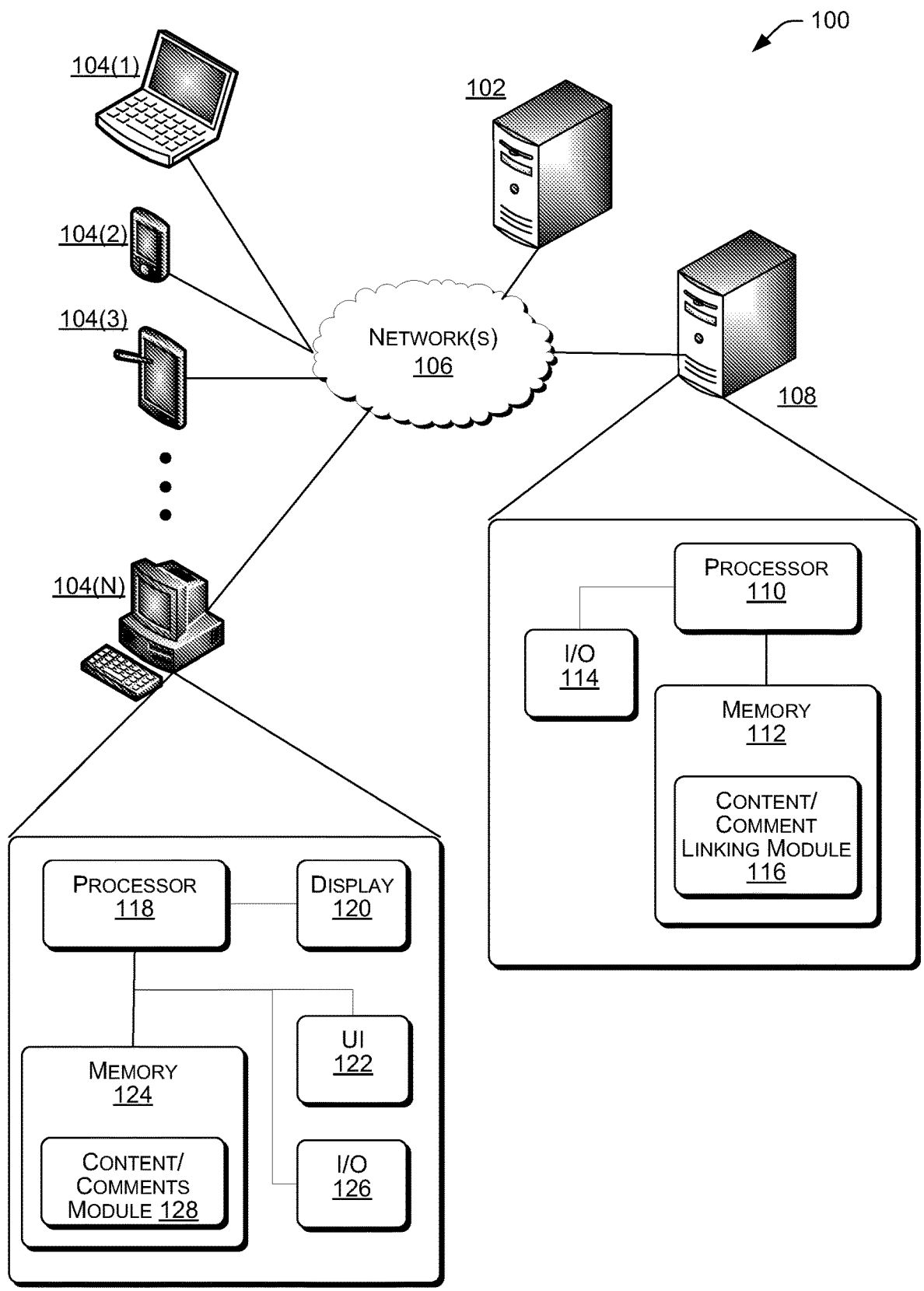
FIG. 1 is a diagram depicting an example environment for implementing news reader and comment linking applications.

FIG. 1 illustrates an example environment for implementing a Comments-Centered News Reader. The Comments-Centered News Reader presents comments (recent and past) according to what part of a received content item (e.g., news articles) the user is currently interacting with (e.g. reading, watching, listening, sensing, etc.).

In an example, a network-based system 100 includes one or more content servers 102, a plurality of client computing devices 104(1)-(N), and one or more content/comment linking servers 108. The content servers 102, the client computing devices 104(1)-(N), and the content/comment linking servers 108 are all in communication across one or more data network 106.

The network(s) 106 can include public networks, such as the Internet, private networks, such as an institutional and/or personal intranet, or some combination of private and public networks. The network(s) 106 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. The network(s) 106 can utilize communications protocols, including packet-based and/or datagram-based protocols such as Internet protocol (IP), transmission control protocol (TCP), user datagram protocol (UDP), or other types of protocols. Moreover, the network(s) 106 can also include a number of devices that facilitate network communications and/or form a hardware basis for the networks, such as switches, routers, gateways, access points, firewalls, base stations, repeaters, backbone devices, and the like.

In example scenarios, the servers 102, 108 can include one or more computing devices that operate in a cluster or other grouped configuration to share resources, balance load, increase performance, provide fail-over support or redundancy, or for other purposes. The servers 102, 108 can belong to a variety of categories or classes of devices such as traditional server-type devices, desktop computer-type devices, mobile-type devices, special-purpose-type devices, embedded-type devices, and/or wearable-type devices. Thus, although illustrated as tower computers, the servers 102, 108 can include a diverse variety of device types and are not limited to a particular type of device. The servers 102, 108 can represent, but are not limited to, desktop computers, server computers, web-server computers, personal computers, mobile computers, laptop computers, tablet computers, wearable computers, implanted computing devices, telecommunication devices, automotive computers, network-enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device.

In some examples, the content/comment linking servers 108 can include at least a processor 110, memory 112 and an input/output (I/O) device 114. The memory 112 may include at least a content/comments linking module 116. The content/comments linking module 116 when executed by the processor 110 causes reception of comments generated by users at any of the devices 104(1)-(N) and reception of information regarding the content that was the target of the comments. The execution of content/comments linking module 116 by the processor 110 causes linking of the received comments to specific portions of the associated content.

Figure 5:
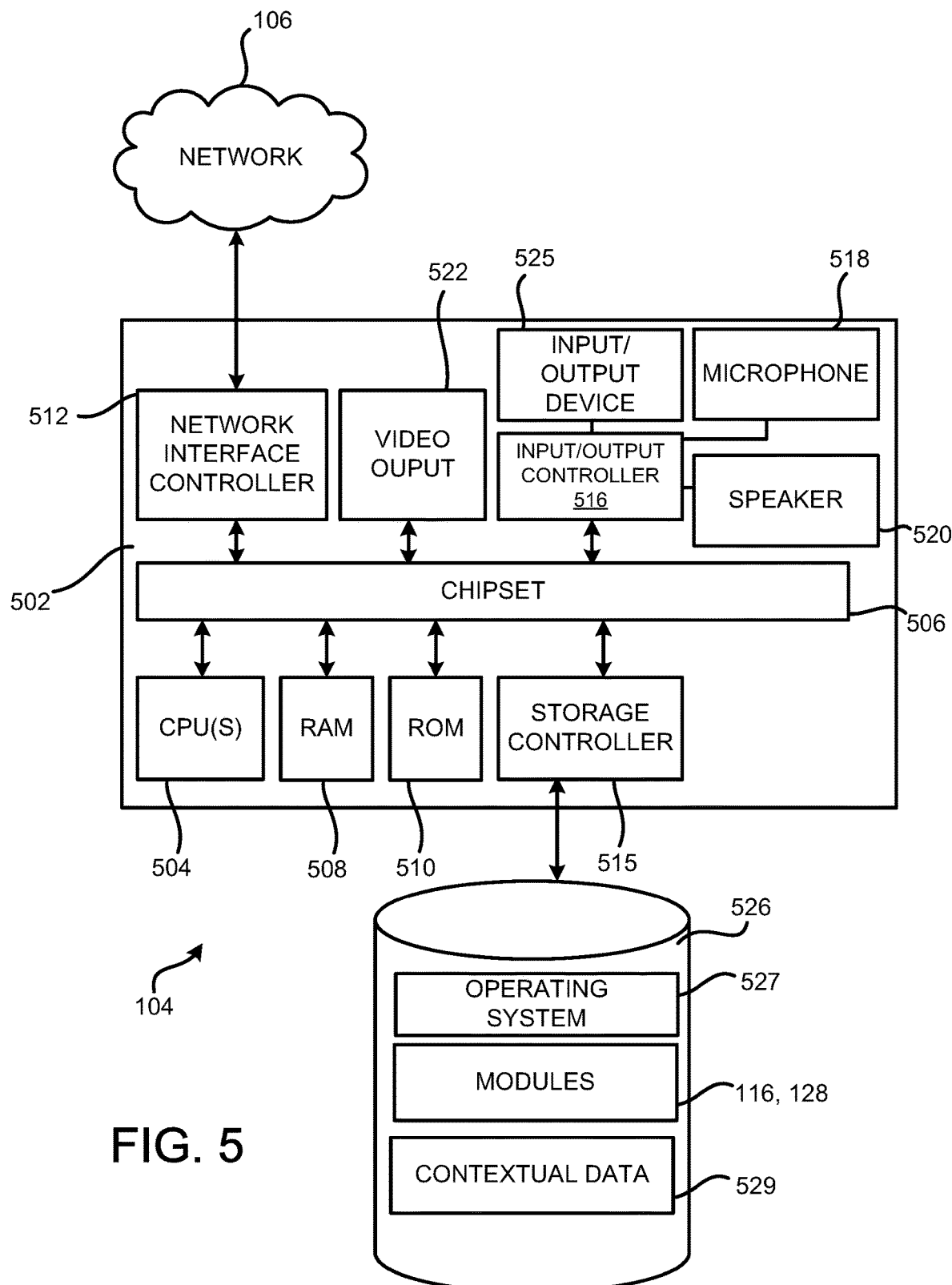
FIG. 5 is a computer architecture diagram showing an illustrative computer hardware and software architecture for a computing device capable of implementing aspects of the configurations presented herein.

The client devices 104(1)-(N) include at least a processor 118, a display 120, a user interface 120, memory 124 and an I/O device 126. The memory 124 may store a content/comments module 128 that, when executed by the processor 118, receives content from a specific content server 102 and linked comment information related to the links from the content/comments linking server 108. Based on knowledge of what content is currently being presented on the display 120 and the received linked comment information, the processor 118, executing other components of the content/comments module 128 presents the comments previously linked to the currently presented content. Also, the processor 118, while executing other components of the content/comments module 128, may present a comments area on the display 120. The comments area can receive user comments related to the presented content. Received comments may be linked to specific portions of the content at the content/comments linking server 108 or at the client device 104 if the client device 104 includes the content/comments linking module 116. Examples of other components of the client devices 104 are shown in FIG. 5.

The functions provided by the modules 116, 128 may be located at other computing locations on the network or may be distributed across multiple computing locations on the network.

Figure 2A:
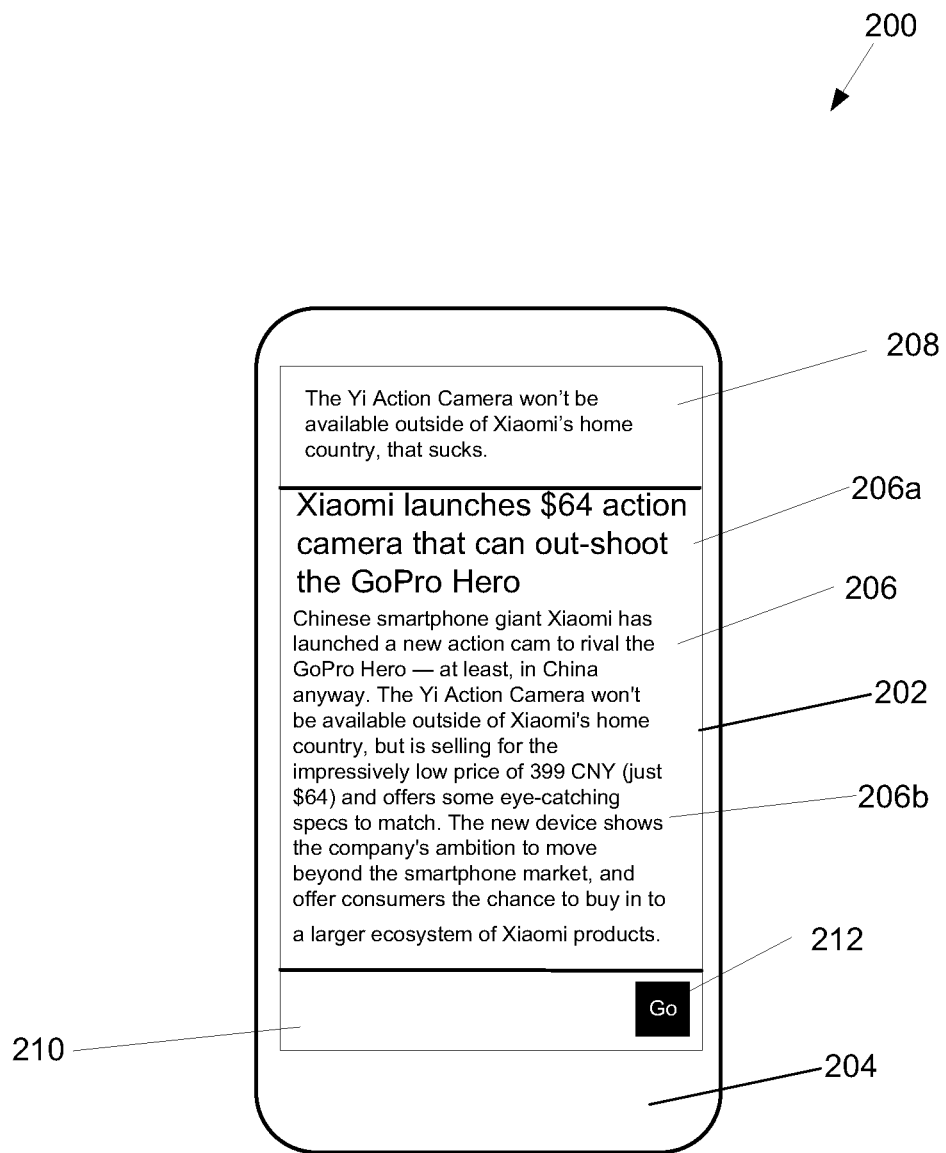
FIGS. 2A-B show an example mobile device enabled to present content and comments based on the functions provided by components of the system shown in FIG. 1.

FIG. 2A shows an example of the client device 104 implemented as a mobile device 200 (i.e., smartphone, personal data assistant, etc.). The mobile device 200 includes a display 202 and may include user interface controls 204. The content/comments module 128 causes the processor 118 to present information regarding content and comments on the display 202 by communicating with the content server 102 and/or the content/comment-linking server(s) 108, as necessary. The processor 118, while executing components of the content/comments module 128, presents content from the content server 102 based on a user's request. An example of a user's request for content may include entry of a news source website address into a browser (not shown) presented on the display 202. The requested content (e.g., a news article webpage) is partially presented within a content presentation area 206 of the display 202.

The presented content may include a title and a body. In this example, the title is presented in a title section 206a of the content presentation area 206. The body of the content is presented in a body section 206b of the content presentation area 206.

The display 202 includes a comments area 208. The comments area 208 may be a selected area that shows past and live comments. The comments area 208 may be presented above, below, or adjacent the content presentation area 206 when viewed by a user. The content/comments module 128 may cause the processor 118 to maintain an open communications link with the entity (e.g., the content/comments-linking server 108) that is linking comments to the currently presented content in the content presentation area 206. The entity may be other client devices 104(1-N), if those other devices include the content/comments-linking module 116. This open communications link allows comments from other user to be linked, sent, then presented live or in near real time on the display 202. Thus, only those comments that were previously linked or will be linked to the content currently displayed in the content presentation area 206 are presented in the comments area 208. The selection of these comments will be determined by the current position that users are interacting with the content (which sentences are shown on the screen).

If the number of comments exceeds a threshold or the size of a comment or a group of comments exceeds a size value of the comments area 208, the linked comments will scroll horizontally or vertically. The scrolling may occur automatically or in response to a user's action of the user interface controls 204 or the display 202 (if the display includes touchscreen components).

The sentences of the content presented in the content presentation area 206 having linked comments may be highlighted or shown in a way unique from those sentences that do not have a linked comment(s).

The display 202 may also include a comment entry area 210. The comment entry area 210 includes a comment input box for allowing users to publish their own comments. The user may associate a comment with content or with the presented content within the content presentation area 206 by activating a Go button 212 or comparable activation mechanism after the user has entered a comment into the comment input box of the comment entry area 210. Upon entry of a comment into the comment entry area 210, the entered comment and content information are sent to the content/comments-linking server 108. Alternately, the content/comments module 128, when stored in the memory 124, causes the processor 118 to link the comment to a certain sentence/phrase within the content.

Figure 2B:
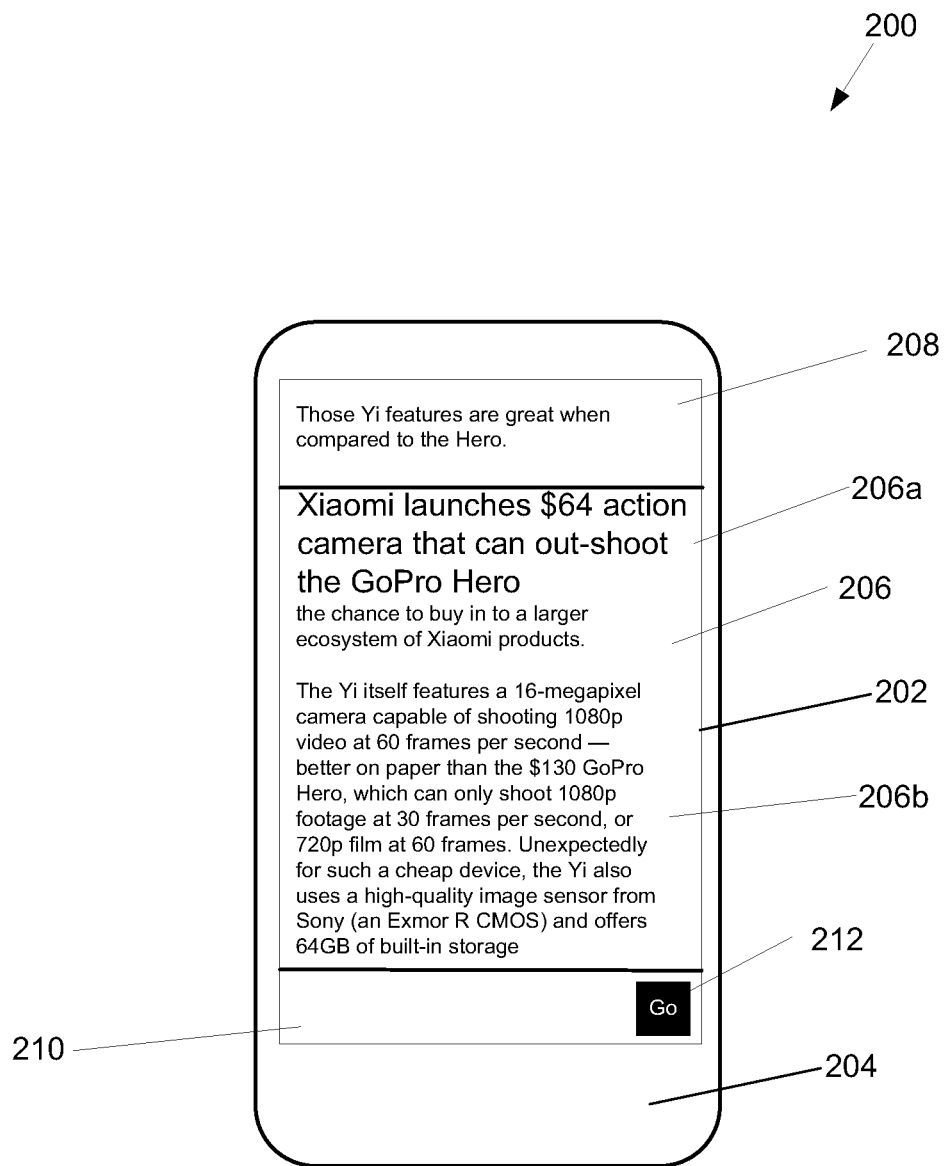

FIG. 2B shows the client device 104 after the user has scrolled the article in the body section 206b. Because a different portion of the article now appears in the body section 206b, the client device 104 scrolls the comments area 208 to show a comment that was identified as being linked to a sentence that now appears in the body section 206b.

The comments are automatically linked to sentences of the content in a classification framework, which includes training a model based on a set of comment/sentence pairs. A training set of extracted features from sample comments and sentences is first created. The training set may use many different comments previously associated with many different content postings. The training set is used to train a classifier for classifying instances using natural language processing techniques. This is described as follows:

Given a content item $S=\{s_1, s_2, \ldots, s_n\}$ (s=sentence) with a comments set $C=\{c_1, c_2, \ldots, c_m\}$, the candidate comment-sentence pairs $T=\{t_{11}, t_{12}, \ldots, t_{mn}\}$ are obtained by computing the Cartesian product of these two sets.

Lexical-level, entity-level and topic-level features are extracted from the obtained pairs. A feature vector $v(t_{pq})$ is created from the extracted features for each $c_p$ and $s_q$ of the training pair $t_{pq}$.

A category of $t_{pq}$ is assigned to be $y_{pq}=1$ and any other pairs $t_{pq}'=<c_p, s_o>$, where $o\neq q$ are assigned to be $y_{po}=0$. Training instances $<t, y>$ are inputted into a support vector machine (SVM) classifier that learns a weight value for each pair.

For a new comment-sentence pair, the SVM classifier can be used to predict the possibility of the pair being true after features have been extracted for the pair.

Examples of extracted lexical features are listed in Table 1.

TABLE 1

| | Extracted Features |
|---|---|
| Lexical-level | cosine similarity |
| | Ave. number of word matches |
| | Ave. number of stem matches |
| | Ave. number of Part-of-Speech matches |
| | Ave. number of function word matches |
| Entity-level | Ave. number of entity type matches |
| | Ave. number of entity matches (for each type) |
| Topic-level | LDA topic vector cosine similarity |

The lexical features include the cosine similarity between a sentence and a comment represented as two Tf-idf vectors. Tf-idf means term-frequency times inverse document-frequency. The lexical features also include the number of common words, stems, part-of-speech (POS) tags and function words. The function words include the verbs and the nouns because they are the most important word types.

The entity level features are computed with the number of common entity types and the number of common entities within each type. All the lexical-level and entity-level numbers are averaged by the length of the associated content sentence. The topic-level features are based on a latent Dirichlet allocation (LDA) analysis of the comments and sentences. After LDA, a topic vector is generated for each comment or sentence, where each dimension means a latent topic in the text. A cosine similarity of the comment and sentence topic vectors is determined. This represents the semantic similarity between comments and content sentences.

The lexical features are used to generate feature vectors. A person managing this training operation applies weights to the feature vectors of each pair based on the person's perception of whether the pair is a likely link. The weighted pairs are applied to a modeler/classifier, such as an SVM classifier, which creates a model/classifier for linking comments to sentences.

Illustrative Processes

The processes 300-400 are illustrated as a collection of blocks in logical flow graphs, which represent a sequence of operations that may be implemented in hardware, software, or a combination thereof. In the context of software, the blocks represent computer-executable instructions stored on one or more computer-readable storage media that, when executed by one or more processors, perform the recited operations. Computer-executable instructions may include routines, programs, objects, components, data structures, and the like that perform particular functions or implement particular abstract types of data. The order in which the operations are described is not intended to be construed as a limitation, and any number of the described blocks may be combined in any order and/or in parallel to implement the illustrated process. One or more of the processes described herein may occur independently or in relation in any order, whether in series or parallel.

The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

Figure 3:
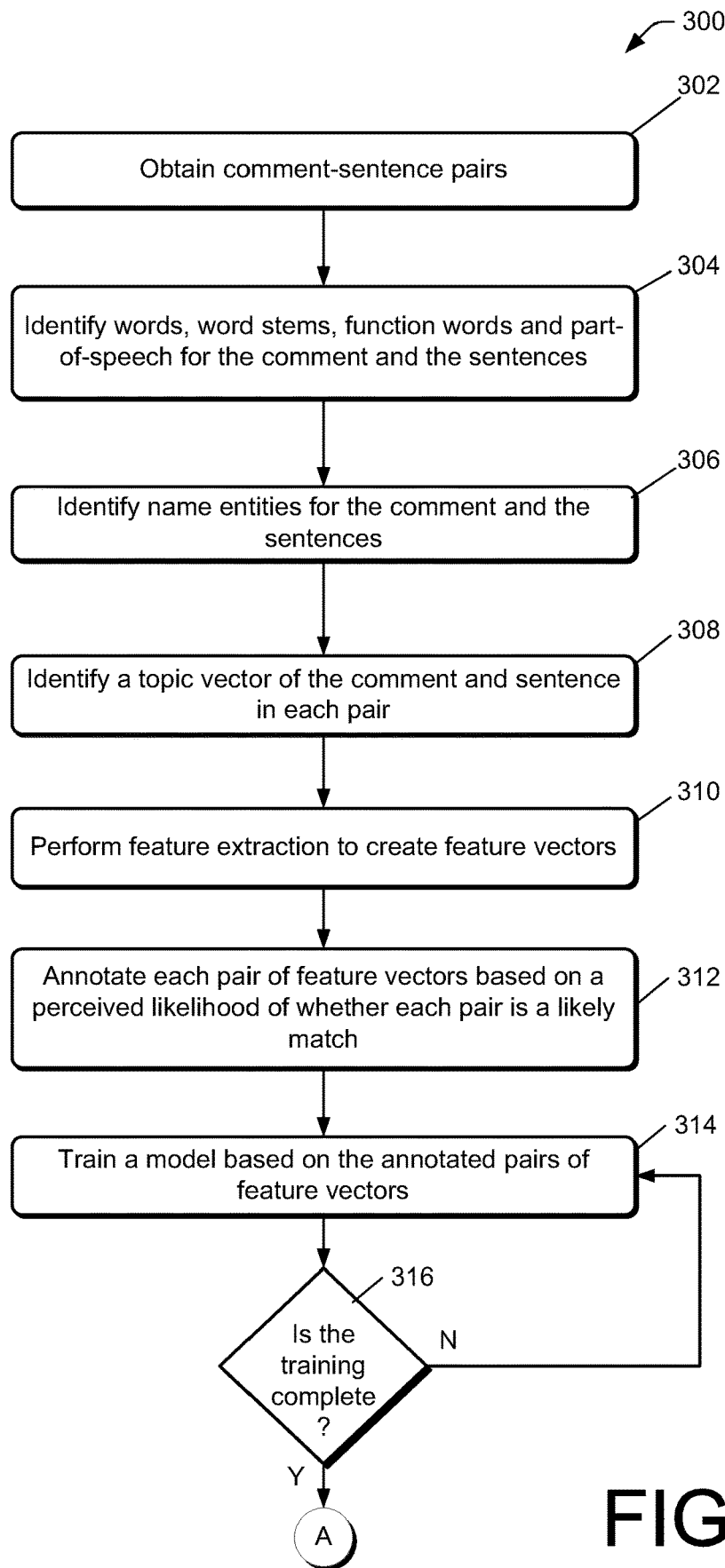
FIG. 3 is a flow diagram depicting an example operation of process for training a news/comment linking and presentation system.

FIG. 3 illustrates a high-level process 300 for training a linking model for use in an autolinking process. The process 300 is a specific implementation using natural language processing (NLP) techniques. First at a block 302, a set of comment-sentence pairs are obtained from training comments and sentences. The set of pairs may be obtained for various genres, for example world news, local news, sports, opinion, food, entertainment, music, etc. Using different genre sets of pairs results in different genre training models. When using a training model associated with a genre similar to currently viewed content, then the process of linking a comment to the content may produce more accurate linked results.

Next at a block 304, words, word stems, function words and part-of-speech (POS) for the comment and the sentences are identified for both items of each pair.

At a block 306, name entities for the comment and the sentence of each pair are identified. Examples of named objects include Eiffel tower, President Lincoln, and Adagio for Strings.

Then at a block 308, a topic of each comment/sentence pair is identified. Identification of a topic includes finding abstract topics in the text. In natural language processing, a topic model is a type of statistical model for discovering abstract topics that may occur in a collection of documents. Intuitively, given that a document is about a particular topic, one would expect particular words to appear in the document more or less frequently. A document typically concerns multiple topics in different proportions. The topic model is captured in a mathematical framework—a topic vector that includes the proportions of words in the respective sentence that is associated with each of multiple topics.

Then at a block 310, features are extracted based on the topic vectors, name entities and other details found at block 304. The result of the feature extraction produces feature vectors for the comment and sentence in each comment/sentence pair.

At a block 312, a trainer annotates each pair of feature vectors based on a perceived likelihood of whether each pair is a match. This annotation may be in the form of a weight value assigned to the pair of feature vectors.

At a block 314, a model or classifier is trained based on the annotated pairs of feature vectors. In one example, an SVM generates the model or classifier based at least on the annotated pairs of feature vectors.

Figure 4:
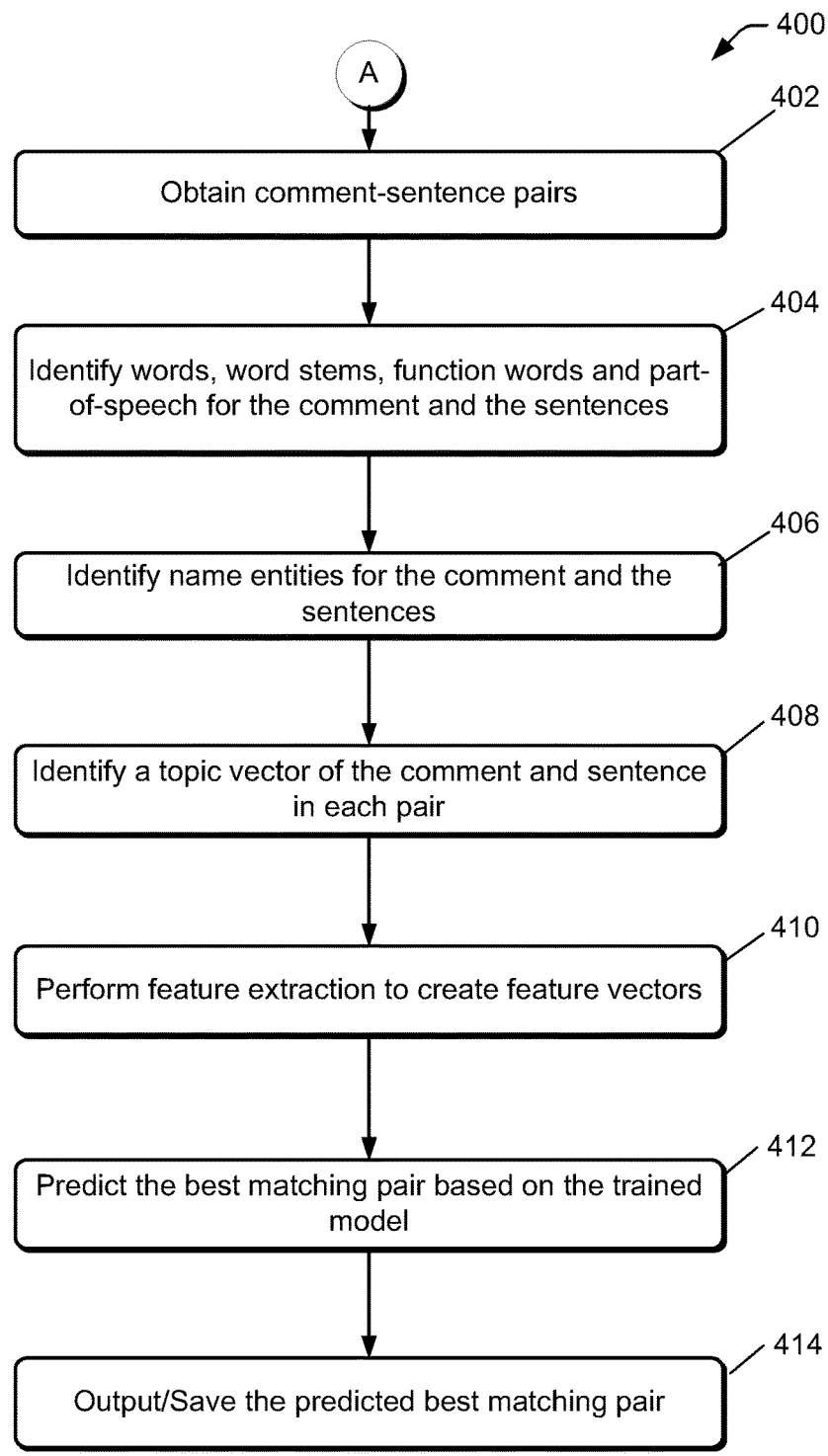
FIG. 4 shows a flow diagram depicting an example operation of process for predicting links between comments and news content.

At a decision block 316, once the training is determined to be complete, the process 300 is ready for analyzing and linking actual comments to content sentences, see process 400 in FIG. 4.

FIG. 4 illustrates a high-level process 400 for automatically linking a comment to one sentence included in the content. The steps shown in blocks 402-410 are similar to those shown in blocks 302-310 of FIG. 3 except only one content and comment are used.

First at a block 402, a set of comment-sentence pairs are obtained from the entered comment and the sentences of a defined content.

Next at a block 404, words, word stems, function words and POS for the comment and the sentence are identified for both items of each pair.

At a block 406, name entities for the comment and the sentence of each pair are identified.

Then at a block 408, a topic vector of each comment/sentence pair is identified. The topic vectors, like those in the training process 300, may be limited in size. Limiting the size of the topic vectors reduces the time and cost associated with this linking process.

Then at a block 410, features are extracted based on the topic vectors. The result of the feature extraction produces feature vectors for the comment and sentence in each comment/sentence pair.

At a block 412, a prediction of whether each comment/sentence pair is the best match is determined based on a comparison with the trained model of FIG. 3. The result is that one of the sentences of the content is determined to be the best match/link for the entered comment.

Then at a block 414, the comment is linked to the identified best matching/linking sentence. This identified link is outputted for future use by the components of the system 100, such as the content/comments module 128.

The following shows an example comment/content sentence pair and the associated analysis.

Comment:
GoPro has some cool products, but it seems like they would be really easy to knock off A rugged camera isn't rocket science.

Sentence from content:
The Yi itself features a 16-megapixel camera capable of shooting 1080p video at 60 frames per second—better on paper than the $130 GoPro Hero, which can only shoot 1080p footage at 30 frames per second, or 720p film at 60 frames.

First each sentence in the pair is stemmed, tokenized, POS tagged (the bold words are POS tags):

NNP GoPro VBZ has DT some JJ cool NNS products, CC but PRP it VBZ seems IN like PRP they MD would VB be RB really JJ easy TO to VB knock RP off .DT A JJ rugged NN camera VBZ is RB n't NN rocket NN science.

DT The NNP Yi PRP itself VBZ features DT a JJ 16-megapixel NN camera JJ capable IN of VBG shooting NN 1080p NN video IN at CD 60 NNS frames IN per JJ second NN—JJR better IN on NN paper IN than DT the NN $130 NNP GoPro NNP Hero, WDT which MD can RB only VB shoot NN 1080p NN footage IN at CD 30 NNS frames IN per JJ second, CC or NN 720p NN film IN at CD 60 NNS frames.

The following is an example list of POS tags:
CC Coordinating conjunction
CD Cardinal number
DT Determiner
EX Existential there
FW Foreign word
IN Preposition or subordinating conjunction
JJ Adjective
JJR Adjective, comparative
JJS Adjective, superlative
LS List item marker
MD Modal
NN Noun, singular or mass
NNS Noun, plural
NNP Proper noun, singular
NNPS Proper noun, plural
PDT Predeterminer
POS Possessive ending
PRP Personal pronoun
PRP$ Possessive pronoun
RB Adverb
RBR Adverb, comparative
RBS Adverb, superlative
RP Particle
SYM Symbol
TO to
UH Interjection
VB Verb, base form
VBD Verb, past tense
VBG Verb, gerund or present participle
VBN Verb, past participle
VBP Verb, non3rd person singular present
VBZ Verb, 3rd person singular present
WDT Wh-determiner
WP Wh-pronoun
WP$ Possessive wh-pronoun
WRB Wh-adverb Next, the sentences are analyzed to find the name entities. The result in the comment is: [GoPro]. The result in the content sentence is: [Yi, GoPro, Hero].

In this example, the number of topics is selected at 5. The following is the topic vector for a topic model of the sentence:
[0.1, 0.1, 0.4, 0.3, 0.1]
And for the comment:
[0.2, 0, 0.2, 0.5, 0.1]

Each dimension of these vectors is associated with an abstract topic and its value equates to the proportions of the words of the comment or sentence that are associated with the abstract topic.

Then, features are extracted from the comment and sentence of the pair based on the above analyses to get feature vectors for the sentence and the comment of each pair:

$F_{sentence}$
$F_{comment}$

Assuming training has already occurred, these feature vectors along with feature vectors of all the other comment/content sentence pairs are analyzed with regard to the trained model/classifier (trained SVM classifier) to determine which of the sentences is to be identified as the link for the comment.

Although the above example is directed to linking text comments to text sentences. Implementations of this invention could be applied to audible comments and audio and/or video content. Voice to text may be used as a technique for converting voice to text. Video analysis technologies may be used to identify events (e.g., change events) in video and then using that information as a basis for linking to comments.

FIG. 5 shows additional details of an example computer architecture for the components shown in FIG. 1 capable of executing the program components described above for providing a comments-centered news reader and linking system. The computer architecture shown in FIG. 5 illustrates a game console, conventional server computer, workstation, desktop computer, laptop, tablet, phablet, network appliance, personal digital assistant ("PDA"), e-reader, digital cellular phone, or other computing device, and may be utilized to execute any of the software components presented herein. For example, the computer architecture shown in FIG. 5 may be utilized to execute any of the software components described above. Although some of the components described herein are specific to the client device 104, it can be appreciated that such components, and other components may be part of the server 108.

The client device 104 includes a baseboard 502, or "motherboard," which is a printed circuit board to which a multitude of components or devices may be connected by way of a system bus or other electrical communication paths. In one illustrative configuration, one or more central processing units ("CPUs") 504 operate in conjunction with a chipset 506. The CPUs 504 may be standard programmable processors that perform arithmetic and logical operations necessary for the operation of the client device 104.

The CPUs 504 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 may provide an interface to a RAM 508, used as the main memory in the client device 104. The chipset 506 may further provide an interface to a computer-readable storage medium such as a read-only memory ("ROM") 510 or non-volatile RAM ("NVRAM") for storing basic routines that help to startup the client device 104 and to transfer information between the various components and devices. The ROM 510 or NVRAM may also store other software components necessary for the operation of the client device 104 in accordance with the configurations described herein.

The client device 104 may operate in a networked environment using logical connections to remote computing devices and computer systems through a network, such as the local area network 106. The chipset 506 may include functionality for providing network connectivity through a network interface controller (NIC) 512, such as a gigabit Ethernet adapter. The NIC 512 is capable of connecting the client device 104 to other computing devices over the network 106. It should be appreciated that multiple NICs 512 may be present in the client device 104, connecting the computer to other types of networks and remote computer systems. The network 106 allows the client device 104 to communicate with remote services and servers, such as the servers 102, 108.

The client device 104 may be connected to a mass storage device 526 that provides non-volatile storage for the computing device. The mass storage device 526 may store system programs, application programs, other program modules, and data, which have been described in greater detail herein. The mass storage device 526 may be connected to the client device 104 through a storage controller 515 connected to the chipset 506. The mass storage device 526 may consist of one or more physical storage units. The storage controller 515 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units. It should also be appreciated that the mass storage device 526, other storage media and the storage controller 515 may include MultiMediaCard (MMC) components, eMMC components, Secure Digital (SD) components, PCI Express components, or the like.

The client device 104 may store data on the mass storage device 526 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 526 is characterized as primary or secondary storage, and the like.

For example, the client device 104 may store information to the mass storage device 526 by issuing instructions through the storage controller 515 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The client device 104 may further read information from the mass storage device 526 by detecting the physical states or characteristics of one or more particular locations within the physical storage units.

In addition to the mass storage device 526 described above, the client device 104 may have access to other computer-readable media to store and retrieve information, such as program modules, data structures, or other data. Thus, although the program module 116, 128 and other modules are depicted as data and software stored in the mass storage device 526, it should be appreciated that these components and/or other modules may be stored, at least in part, in other computer-readable storage media of the client device 104. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the client device 104.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the client device 104. For purposes of the claims, the phrase "computer storage medium," and variations thereof, does not include waves or signals per se and/or communication media.

The mass storage device 526 may store an operating system 527 utilized to control the operation of the client device 104. According to one configuration, the operating system comprises a gaming operating system. According to another configuration, the operating system comprises the WINDOWS®, UNIX, ANDROID, WINDOWS PHONE or iOS operating systems, available from their respective manufacturers. It should be appreciated that other operating systems may also be utilized. The mass storage device 526 may store other system or application programs and data utilized by the client device 104, such as the program modules 116, 128, contextual data 529 and/or any of the other software components and data described above. The mass storage device 526 might also store other programs and data not specifically identified herein.

In one configuration, the mass storage device 526 or other computer-readable storage media is encoded with computer-executable instructions which, when loaded into the client device 104, transform the computer from a general-purpose computing system into a special-purpose computer capable of implementing the configurations described herein. These computer-executable instructions transform the client device 104 by specifying how the CPUs 504 transition between states, as described above. According to one configuration, the client device 104 has access to computer-readable storage media storing computer-executable instructions which, when executed by the client device 104, perform the various routines described above with regard to FIG. 5 and the other figures. The client device 104 might also include computer-readable storage media for performing any of the other computer-implemented operations described herein.

The client device 104 may also include one or more input/output controllers 516 for receiving and processing input from a number of input devices, such as a keyboard, a mouse, a microphone, a headset, a touchpad, a touch screen, an electronic stylus, or any other type of input device. Also shown, the input/output controllers 516 is in communication with an input/output device 525. The input/output controller 516 may provide output to a display, such as a computer monitor, a HMD, a flat-panel display, a digital projector, a printer, a plotter, or other type of output device. The input/output controller 516 may provide input communication with other devices such as a microphone 518, a speaker 520, game controllers and/or audio devices. In addition, or alternatively, a video output 522 may be in communication with the chipset 506 and operate independent of the input/output controllers 516. It will be appreciated that the client device 104 may not include all of the components shown in FIG. 5, may include other components that are not explicitly shown in FIG. 5, or may utilize an architecture completely different than that shown in FIG. 5.

Example Clauses

A: A computer-implemented method comprising: receiving, at a computing device, information associated with a content item produced by a source system, the content item being accessible to other the computing devices via a network; receiving, at the computing device, a comment associated with the content item, the comment produced by one of the other computing devices; in response to receiving the information and the comment, predicting, at the computing device, a subsection of the content item to link to the received comment based at least on details associated with the content item and the comment; and making information associated with the predicted subsection of the content item available to other computing devices requesting access to the content item.

B: The computer-implemented method of clause A, wherein predicting comprises: identifying pairs of the comment and each sentence of the associated content item; comparing the identified pairs; and predicting the sentence of the content item to link with the comment based at least on the comparison of the identified pairs.

C: The computer-implemented method of clause B, wherein comparing the identified pairs comprises: identifying lexical-level features for the comment and the sentence of each pair; identifying entity-level features for the comment and the sentence of each pair; identifying topic vectors for the comment and the sentence of each pair; creating feature vectors based at least on the identified lexical-level features, entity-level features and topic vectors; and comparing the created feature vectors.

D: The computer-implemented method of clause C, wherein comparing the created feature vectors comprises: analyzing the created feature vectors using a classifier trained based on a sample set of comments and sentences form a plurality of differently sourced content items.

E: The computer-implemented method of clause D, wherein the classifier comprises: a plurality of feature vectors created from the following associated with the sample set of comments and sentences form a plurality of differently sourced content items: lexical-level features for the comment and the sentence of each pair; entity-level features for the comment and the sentence of each pair; topic vectors for the comment and the sentence of each pair; and feature vectors based at least on the identified lexical-level features, wherein each of the plurality of feature vectors of the classifier comprise a weight value based on manually assigned link value information.

F: The computer-implemented method of clause E, further comprising generating the classifier using a support vector machine.

G: The computer-implemented method of clause A-F, wherein the information associated with the content item comprises information regarding what portion of the content item was presented during reception of the comment.

H: The computer-implemented method of clause A-G, further comprising: receiving a request for the content item from another computing device; and transmitting at least the information associated with the predicted subsection of the content item to the computing device initiating the request for the content item.

I: The computer-implemented method of clause A-H, further comprising: receiving a request for the content item from another computing device; transmitting the requested content item; and transmitting the information associated with the predicted subsection of the content item to the computing device initiating the request for the content item.

J: The computer-implemented method of clause A-I, wherein the produced content item comprises a website including a new article.

K: A computing device comprising: a processor; a display device; and a computer-readable storage medium in communication with the processor, the computer-readable storage medium having computer-executable instructions stored thereupon which, when executed by the processor, cause the computer to: receive information associated with a content item produced by a source system, the content item being accessible to other the computing devices via a network; receive a comment associated with the content item, the comment produced by one of the other computing devices; in response to receiving the information and the comment, predict a subsection of the content item to link to the received comment based at least on details associated with the content item and the comment; and make information associated with the predicted subsection of the content item available to other computing devices requesting access to the content item.

L: The computing device of clause K, wherein predicting comprises: identifying pairs of the comment and each sentence of the associated content item; comparing the identified pairs; and predicting the sentence of the content item to link with the comment based at least on the comparison of the identified pairs.

M: The computing device of clause L, wherein comparing the identified pairs comprises: identifying lexical-level features for the comment and the sentence of each pair; identifying entity-level features for the comment and the sentence of each pair; identifying topic vectors for the comment and the sentence of each pair; creating feature vectors based at least on the identified lexical-level features, entity-level features and topic vectors; and comparing the created feature vectors.

N: The computing device of clause M, wherein comparing the created feature vectors comprises: analyzing the created feature vectors using a classifier trained based on a sample set of comments and sentences form a plurality of differently sourced content items.

O: The computing device of clause N, wherein the classifier comprises: a plurality of feature vectors created from the following associated with the sample set of comments and sentences form a plurality of differently sourced content items: lexical-level features for the comment and the sentence of each pair; entity-level features for the comment and the sentence of each pair; topic vectors for the comment and the sentence of each pair; and feature vectors based at least on the identified lexical-level features, wherein each of the plurality of feature vectors of the classifier comprise a weight value based on manually assigned link value information.

P: The computing device of clause O, wherein the information associated with the content item comprises information regarding what portion of the content item was presented during reception of the comment.

Q: The computing device of clause K-O, wherein the computer-readable storage medium has further computer-executable instructions stored thereon that cause the computer to: receiving a request for the content item from another computing device; transmitting the requested content item; and transmitting the information associated with the predicted subsection of the content item to the computing device initiating the request for the content item, wherein the produced content item comprises a website including a new article.

R: A computer-readable storage medium having computer-executable instructions stored thereupon which, when executed by a computer, cause the computer to: receive information associated with a content item produced by a source system, the content item being accessible to other the computing devices via a network; receive a comment associated with the content item, the comment produced by one of the other computing devices; in response to receiving the information and the comment, predict a subsection of the content item to link to the received comment based at least on details associated with the content item and the comment; and make information associated with the predicted subsection of the content item available to other computing devices requesting access to the content item.

S: The computer-readable storage medium of clause R, wherein predicting comprises: identifying pairs of the comment and each sentence of the associated content item; comparing the identified pairs; and predicting the sentence of the content item to link with the comment based at least on the comparison of the identified pairs, wherein comparing the identified pairs comprises: identifying lexical-level features for the comment and the sentence of each pair; identifying entity-level features for the comment and the sentence of each pair; identifying topic vectors for the comment and the sentence of each pair; creating feature vectors based at least on the identified lexical-level features, entity-level features and topic vectors; and comparing the created feature vectors.

T. The computer-readable storage medium of clause R-S, further comprising computer-executable instructions that cause the computer to: receive a request for the content item from another computing device; transmit the requested content item; and transmit the information associated with the predicted subsection of the content item to the computing device initiating the request for the content item, wherein the produced content item comprises a website including a new article.

CONCLUSION

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple suboperations, and/or executed in parallel to implement the described processes. The described processes can be performed by resources associated with one or more device(s), such as one or more internal or external CPUs or GPUs, and/or one or more pieces of hardware logic, such as FPGAs, DSPs, or other types of accelerators.

All of the methods and processes described above may be embodied in, and fully automated via, software code modules executed by one or more general-purpose computers or processors. The code modules may be stored in any type of computer-readable storage medium or other computer storage device. Some or all of the methods may alternatively be embodied in specialized computer hardware.

Any routine descriptions, elements, or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved, as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A computer-implemented method, comprising:
   receiving, at a computing device, a content item produced by a source system, the content item being accessible to other computing devices via a network;
   receiving, at the computing device, a first comment associated with the content item and a second comment associated with the content item, the first comment and the second comment produced by one or more of the other computing devices;
   predicting, at the computing device, a first subsection of the content item to link to the first comment based on a first semantic similarity between the content item and the first comment, wherein predicting the first subsection comprises:
   comparing pairs comprising the first comment and each sentence of the content item; and
   predicting the sentence of the content item to link with the first comment based at least on the comparison of the pairs;
   predicting, at the computing device, a second subsection of the content item to link to the second comment based on a second semantic similarity between the content item and the second comment;
   linking the first comment with the first subsection based on the first semantic similarity;
   linking the second comment with the second subsection based on the second semantic similarity;
   when the first subsection of the content item is presented in a first section of a display device, presenting the first comment in a second section of the of the display device; and
   when the second subsection of the content item is presented in the first section of the display device, presenting the second comment in the second section of the display device.

2. The computer-implemented method of claim 1, wherein comparing the identified pairs comprises:
   identifying lexical-level features for the first comment and the sentence of each pair;
   identifying entity-level features for the first comment a and the sentence of each pair;
   identifying topic vectors for the first comment and the sentence of each pair;
   creating feature vectors based at least on the identified lexical-level features, entity-level features and topic vectors; and
   comparing the created feature vectors.

3. The computer-implemented method of claim 2, wherein comparing the created feature vectors comprises:
   analyzing the created feature vectors using a classifier trained based on a sample set of comments and sentences from a plurality of differently sourced content items.

4. The computer-implemented method of claim 3, wherein the classifier comprises:
   a plurality of feature vectors created from:
      lexical-level features for the first comment and the sentence of each pair;
      entity-level features for the first comment and the sentence of each pair;
      topic vectors for the first comment and the sentence of each pair; and
      feature vectors based at least on the identified lexical-level features,
   wherein each of the plurality of feature vectors of the classifier comprises a weight value based on manually assigned link value information.

5. The computer-implemented method of claim 4, further comprising generating the classifier using a support vector machine.

6. The computer-implemented method of claim 1, further comprising:
   receiving a request for the content item from at least one of the other computing devices; and
   transmitting information associated with the first subsection of the content item to the at least one of the other computing devices initiating the request for the content item.

7. The computer-implemented method of claim 1, further comprising:
receiving a request for the content item from at least one of the other computing devices;
transmitting the requested content item to the at least one of the other computing devices; and
transmitting information associated with the first subsection to the at least one of the other computing devices initiating the request for the content item.

8. The computer-implemented method of claim 7, wherein the requested content item comprises a website including an article.

9. The computer-implemented method of claim 1, wherein presenting the first comment in the second section of the of the display device comprises scrolling the first comment horizontally or vertically when the size of the first comment exceeds a threshold.

10. A computing device, comprising:
a processor;
a display device; and
a computer-readable storage medium in communication with the processor, the computer-readable storage medium having computer-executable instructions stored thereupon that, when executed by the processor, perform operations, comprising:
receiving information associated with a content item produced by a source system, the content item being accessible to other computing devices via a network;
receiving a plurality of comments associated with the content item, the plurality of comments produced by one or more of the other computing devices;
based on the information and the plurality of comments, predicting at least two subsections of the content item to link to at least two of the plurality of comments based, at least in part, on semantic similarity between the content item and the plurality of comments, wherein predicting the at least two subsections comprises:
comparing pairs comprising at least one of the plurality of comments and each sentence of the content item; and
predicting the sentence of the content item to link with the at least one of the plurality of comments based at least on the comparison of the pairs;
linking the at least two of the plurality of comments with one or more of the at least two predicted subsections based on the semantic similarity;
presenting a first one of the at least two of the plurality of comments in a first section of the display device while presenting a first one of the at least two predicted subsections of the content item in a second section of the display device; and
scrolling the content item to present a second one of the at least two predicted subsections of the content item in the second section of the display device; and
presenting a second one of the at least two of the plurality of comments in the first section of the display device while presenting the second one of the at least two predicted subsections of the content item in the second section of the display device.

11. The computing device of claim 10, wherein comparing the identified pairs comprises:
identifying lexical-level features for the at least one of the plurality of comments and the sentence of each pair;
identifying entity-level featuresfor the at least one of the plurality of comments and the sentence of each pair;
identifying topic vectors for the at least one of the plurality of comments and the sentence of each pair;
creating feature vectors based at least on the identified lexical-level features, entity-level features and topic vectors; and
comparing the created feature vectors.

12. The computing device of claim 11, wherein comparing the created feature vectors comprises:
analyzing the created feature vectors using a classifier trained based on a sample set of comments and sentences form a plurality of differently sourced content items.

13. The computing device of claim 12, wherein the classifier comprises:
a plurality of feature vectors created from:
lexical-level features for the at least one of the plurality of comments and the sentence of each pair;
entity-level features for the at least one of the plurality of comments and the sentence of each pair; topic vectors for the comment and the sentence of each pair; and
feature vectors based at least on the identified lexical-level features,
wherein each of the plurality of feature vectors of the classifier comprises a weight value based on manually assigned link value information.

14. The computing device of claim 13, further comprising instructions for:
generating the classifier using a support vector machine.

15. The computing device of claim 10, further comprising instructions for:
receiving a request for the content item from at least one of the other computing devices;
transmitting the requested content item to the at least one of the other computing devices; and
transmitting information associated with the predicted at least two subsections of the content item to the at least one of the other computing devices.

16. The computing device of claim 10, wherein the content item comprises one or more news articles.

17. A computer-readable storage medium having computer-executable instructions stored thereupon that, when executed by a processor, cause the computer-readable storage medium to:
receive a content item produced by a source system, the content item being accessible to other computing devices via a network;
receive a plurality of comments associated with the content item, the plurality of comments produced by one or more of the other computing devices;
predict at least two subsections of the content item to link to at least two of the plurality of comments based, at least in part, on semantic similarity between the content item and the plurality of comments, wherein predicting the at least two subsections comprises:
comparing pairs comprising at least one of the plurality of comments and each sentence of the content item; and
predicting the sentence of the content item to link with the at least one of the plurality of comments based at least on the comparison of the pairs;
link the at least two of the plurality of comments with one or more of the at least two predicted subsections based on the semantic similarity;
present a first one of the at least two of the plurality of comments in a first section of a display device while presenting a first one of the at least two predicted subsections of the content item in a second section of the display device; and based on receiving an instruction to scroll the content item:

scroll the presentation in the second section of the display device to a second one of the at least two predicted subsections of the content item; and based on a second of the at least two of the plurality of comments being linked to the second one of the at least two predicted subsections of the content item, scroll the presentation in the first section of the display device to a second one of the at least two of the plurality of comments.

18. The computer-readable storage medium of claim 17, wherein comparing the pairs comprises:

identifying lexical-level features for the at least one of the plurality of comments and the sentence of each pair;

identifying entity-level features for the at least one of the plurality of comments and the sentence of each pair;

identifying topic vectors for the at least one of the plurality of comments and the sentence of each pair;

creating feature vectors based at least on the identified lexical-level features, entity-level features and topic vectors; and comparing the created feature vectors.

19. The computer-readable storage medium of claim 18, wherein comparing the created feature vectors comprises:

analyzing the created feature vectors using a classifier trained based on a sample set of comments and sentences form a plurality of differently sourced content items.

20. The computer-readable storage medium of claim 17, further comprising computer-executable instructions causing the computer-readable storage medium to:

receive a request for the content item from at least one of the other computing devices;

transmit the requested content item to the at least one of the other computing devices; and transmit information associated with the predicted at least two subsections of the content item to at least one of the other computing devices, wherein the produced content item comprises a website including an article.

* * * * *